US011288355B2

(12) United States Patent
Ding et al.

(10) Patent No.: US 11,288,355 B2
(45) Date of Patent: Mar. 29, 2022

(54) DETECTOR FOR ONLINE USER VERIFICATION

(71) Applicant: International Business Machines Corporation, Armonk, NY (US)

(72) Inventors: Chengmin Ding, Chantilly, VA (US); Stanley John Vernier, Grove City, OH (US); Elinna Shek, Ashburn, VA (US); Renee F. Decker, Brunswick, MD (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/866,958

(22) Filed: May 5, 2020

(65) Prior Publication Data
US 2021/0349984 A1 Nov. 11, 2021

(51) Int. Cl.
*G06T 11/60* (2006.01)
*G06F 21/36* (2013.01)
*G06Q 50/26* (2012.01)

(52) U.S. Cl.
CPC .............. *G06F 21/36* (2013.01); *G06T 11/60* (2013.01); *G06F 2221/2103* (2013.01); *G06Q 50/265* (2013.01)

(58) Field of Classification Search
CPC ................... G06F 2221/2103; G06F 3/048–05
See application file for complete search history.

(56) References Cited

U.S. PATENT DOCUMENTS 7,892,079 B2 * 2/2011 Liu .................. A63F 13/80
463/9
8,391,771 B2 3/2013 Goodman
8,522,327 B2 8/2013 Broder
8,671,058 B1 3/2014 Isaacs
8,713,703 B2 4/2014 Fisk
8,904,493 B1 * 12/2014 Dibble .................. H04L 63/08
726/4
9,213,812 B1 * 12/2015 Windell ................ G06F 21/31
(Continued)

FOREIGN PATENT DOCUMENTS

CN 107103225 A 8/2017

OTHER PUBLICATIONS

Shi et al., "Adversarial CAPTCHAs," arXiv:1901.01107, Jan. 2019, 16 pages.

(Continued)

*Primary Examiner* — Daniel Rodriguez
(74) *Attorney, Agent, or Firm* — VanLeeuwen & VanLeeuwen; Alexander G. Jochym

(57) ABSTRACT

An approach is provided in which the approach provides a first question to a requestor requesting access to a resource. The first question corresponds to a first cognitive level and includes at least one image selected from a set of images. The approach computes a confidence value of a first answer received from the requestor responding to the first question. In response to determining that the confidence value is below a confidence threshold, the approach provides a second question to the requestor corresponding to a second cognitive level that is increased from the first cognitive level. The approach grants access to the requestor in response to determining that a second answer received from the requestor responding to the second question is a correct answer.

12 Claims, 8 Drawing Sheets

(56) References Cited

U.S. PATENT DOCUMENTS

| | | | |
|---|---|---|---|
| 10,026,180 B1* | 7/2018 | Gu | G06T 7/73 |
| 10,216,923 B2 | 2/2019 | Fedor | |
| 10,318,978 B2* | 6/2019 | Hamilton, II | G06Q 30/0217 |
| 2007/0201745 A1* | 8/2007 | Wang | G06K 9/00 |
| | | | 382/181 |
| 2008/0066014 A1* | 3/2008 | Misra | G06F 21/36 |
| | | | 715/846 |
| 2009/0049089 A1* | 2/2009 | Adachi | G06F 3/015 |
| 2009/0113294 A1 | 4/2009 | Sanghavi | |
| 2009/0138723 A1* | 5/2009 | Nyang | G06F 21/36 |
| | | | 713/182 |
| 2009/0325661 A1* | 12/2009 | Gross | A63F 13/61 |
| | | | 463/9 |
| 2010/0031330 A1* | 2/2010 | Von Ahn | G06F 21/36 |
| | | | 726/5 |
| 2010/0251388 A1* | 9/2010 | Dorfman | G06F 21/36 |
| | | | 726/29 |
| 2010/0325706 A1* | 12/2010 | Hachey | G06F 21/36 |
| | | | 726/6 |
| 2011/0029781 A1* | 2/2011 | Clark | G06F 21/31 |
| | | | 713/182 |
| 2011/0113378 A1* | 5/2011 | Boden | G06F 21/36 |
| | | | 715/837 |
| 2011/0231913 A1 | 9/2011 | Feng | |
| 2012/0191575 A1* | 7/2012 | Vilke | G06Q 30/0641 |
| | | | 705/27.1 |
| 2012/0246737 A1* | 9/2012 | Paxton | G06F 16/24578 |
| | | | 726/27 |
| 2012/0272302 A1* | 10/2012 | Zhu | G06F 21/36 |
| | | | 726/6 |
| 2013/0019286 A1* | 1/2013 | Barborak | G06F 21/31 |
| | | | 726/4 |
| 2014/0101608 A1* | 4/2014 | Ryskamp | G06F 3/0484 |
| | | | 715/810 |
| 2015/0269387 A1* | 9/2015 | Cannarsa | H04W 12/06 |
| | | | 726/30 |
| 2019/0303555 A1* | 10/2019 | Agarwal | G06T 15/04 |
| 2019/0333400 A1* | 10/2019 | Saini | G06N 7/005 |
| 2020/0065471 A1* | 2/2020 | Peng | G06N 3/08 |
| 2020/0193009 A1* | 6/2020 | Shafet | G06F 21/36 |
| 2020/0342879 A1* | 10/2020 | Carbune | G10L 17/04 |

OTHER PUBLICATIONS

Bengio, "Challenges for Deep Learning towards Human-Level AI," Computing in the 21st Century Conference and MSR Asia Faculty Summit, Beijing, Nov. 7, 2018, 41 pages.

Evans, "How to trick a neural network into thinking a panda is a vulture," Code Words, Issue Five, 2013, 23 pages.

* cited by examiner

DETECTOR FOR ONLINE USER VERIFICATION

BACKGROUND

Websites typically use a verification process to determine whether a requestor is a human or a computer bot before the website allows the requestor to log in or access sensitive functions such as online payments. Current verification approaches usually request a user to perform a low-level cognitive task using a CAPTCHA to identify an object or character set from a picture. CAPTCHA is an acronym for "Completely Automated Public Turing test to tell Computers and Humans Apart." Websites use CAPTCHAs for human verification and are fully automated and require little maintenance or intervention. Modern text-based CAPTCHAs are designed such that they require the simultaneous use of three separate abilities to correctly complete the task with any consistency, which are invariant recognition, segmentation, and parsing.

Some websites require complex, high-level cognitive tasks to determine whether a requestor is a human or a computer bot, such as requiring the requestor to perform object recognition. Object recognition is typically more complex to perform than text recognition and therefore is more resilient to machine learning based computer bot attacks.

BRIEF SUMMARY

According to one embodiment of the present disclosure, an approach is provided in which the approach provides a first question to a requestor requesting access to a resource. The first question corresponds to a first cognitive level and includes at least one image selected from a set of images. The approach computes a confidence value of a first answer received from the requestor responding to the first question. In response to determining that the confidence value is below a confidence threshold, the approach provides a second question to the requestor corresponding to a second cognitive level that is increased from the first cognitive level. The approach grants access to the requestor in response to determining that a second answer received from the requestor responding to the second question is a correct answer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
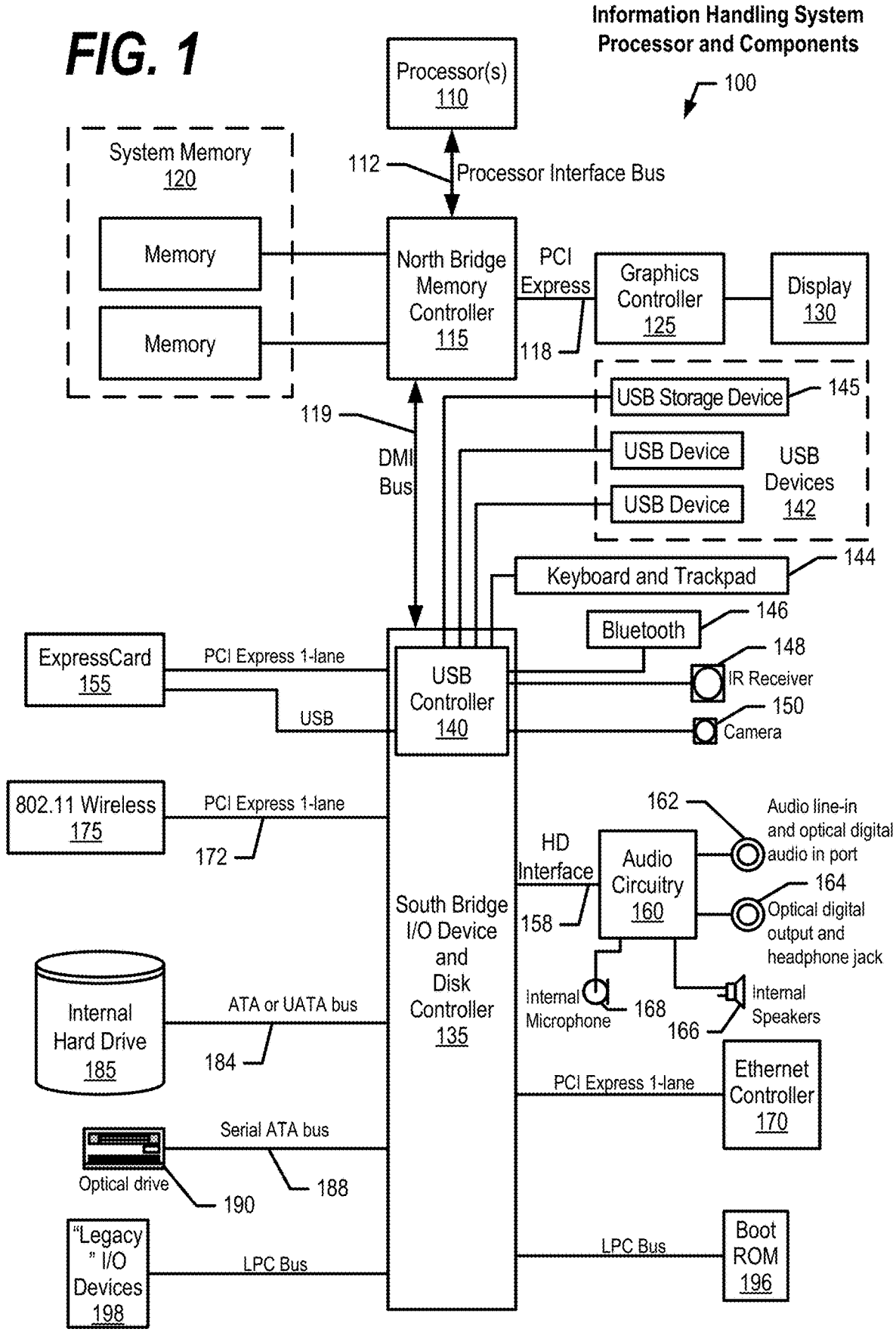
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
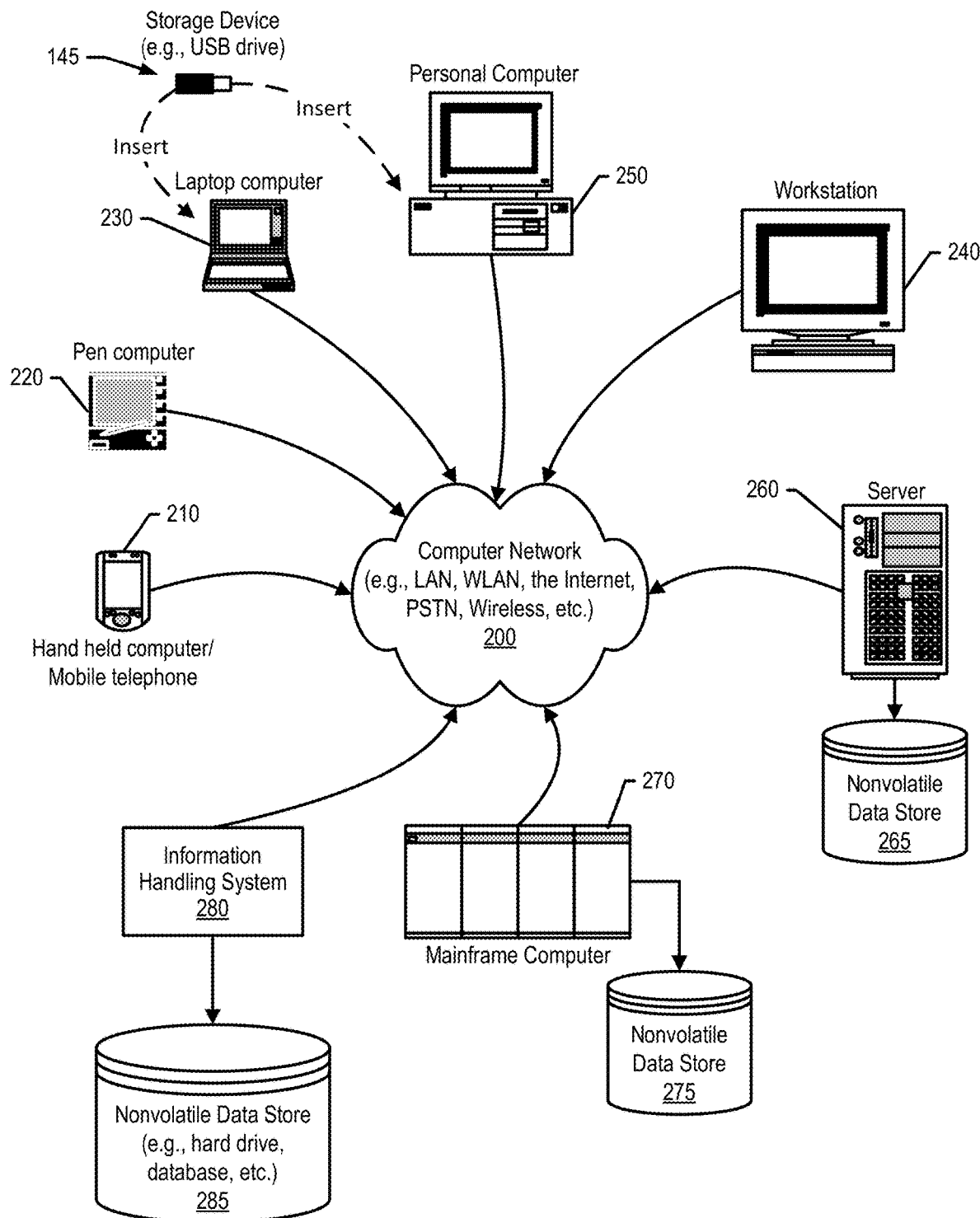
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, websites use either low-level cognitive tasks or high-level cognitive tasks to determine whether a requestor is a human. A challenge found with low-level cognitive tasks is that they are no longer effective in detecting humans from computer bots because computer bots now use advanced machine learning abilities, advanced visual recognition, and advanced object detection technologies to solve the low-level tasks. A challenge found with high-level cognitive tasks is that they are becoming increasingly difficult for humans to pass because significant complexities (e.g., noise, blurring images, etc.) are injected to counter ever-advancing computer bot object recognition techniques. As a result, human verification is either too easy that an advanced bot (low-precision) can pass, or the verification is too difficult because of injected noise and humans have difficulty passing the test.

FIGS. 3 through 8 depict an approach that can be executed on an information handling system that tests both low-order cognitive capabilities and high-order cognitive capabilities to increase precision and recall of human detection tasks without sacrificing usability. As discussed herein, the approach detects humans from online bots or automated agents based on an artificial intelligence (AI)/Cognitive Psychology technique.

Figure 3:
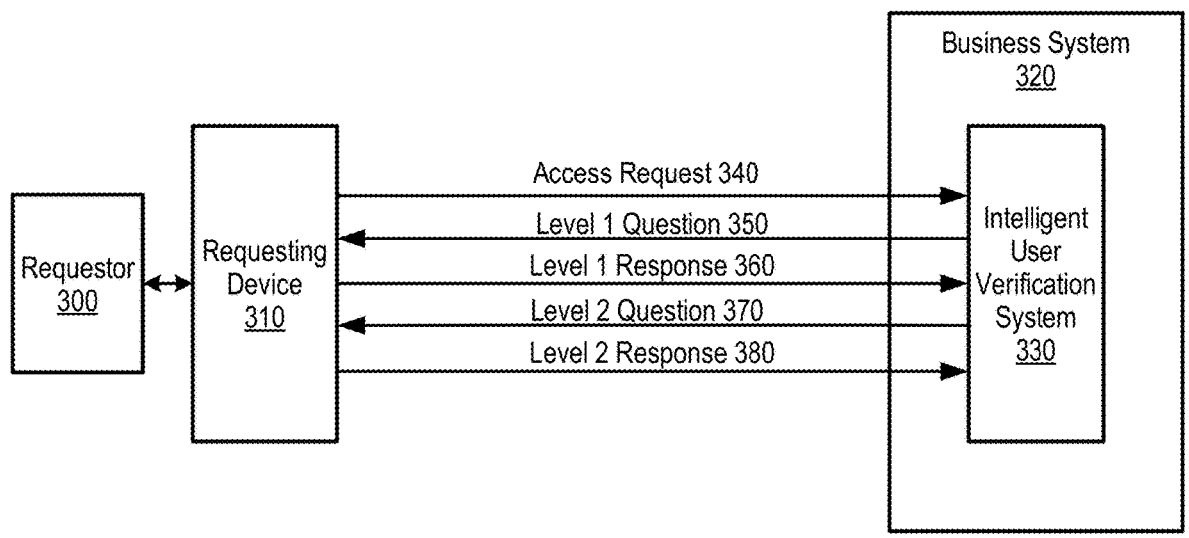
FIG. 3 is an exemplary diagram depicting an intelligent requestor verification system that that uses a two-tier approach to determine whether a requestor is a human.

FIG. 3 is an exemplary diagram depicting an intelligent requestor verification system that that uses a two-tier approach to determine whether a requestor is a human. Business system 320 includes intelligent user verification system 330 that verifies both low-level cognitive behaviors (level 1) and high-level cognitive behaviors (level 2) to intelligently detect a human. As defined herein, cognitive ability and cognitive levels correspond to a general mental capability involving reasoning, problem solving, planning, abstract thinking, complex idea comprehension, and learning from experience.

Requestor 300 (e.g., a human or computer bot) uses requesting device 310 to send access request 340 to business system 320. Requestor 300 may be integrated into requesting device 310 when requestor 300 is a computer bot. Intelligent user verification system 330 intercepts access request 340 and sends level 1 question 350 to requesting device 310. Level 1 question 350 (first cognitive level) exploits the weakness of state-of-art machine learning (ML)/deep learning (DL) techniques by using fake images that do not fool a human being but easily fools a ML/DL based computer bot. Below are definitions of various image types discussed herein:

Real Image: An actual image without distortions (e.g., a dog image)

Fake Image: An image that includes distortions to deceive machine learning algorithms. (e.g., a dog image with distortions)

Simple Image: A fake image of a single image. (e.g., a dog image with distortions)

Composite Image: A combination of fake images or a combination of real images with fake images As discussed in more detail below and shown in FIG. 5, fake images are generated by adding distortion data into a real image to deceive a malicious machine learning system. In one embodiment, the approach discussed herein generates fake images by using back propagation techniques to determine a type of "shape" that the machine learning system is searching for at a point in its neural network and adding the shape into an image without over distorting the image so that a human is still able to determine the image.

In one embodiment, intelligent user verification system 330 increases the complexity of level 1 question 350 such as requiring requestor 300 to count the number of dogs or the number of poodles in an image. These questions add more complexity to object detection techniques but remain a simple cognitive level detection effort for human. In another embodiment, intelligent user verification system 330 asks questions pertaining to "color", "blurring", "emotion" etc., adding additional difficulties for computer bot object detection systems to recognize.

Intelligent user verification system 330 receives level 1 response 360 from requesting device 310 and computes a confidence value of level 1 response 360. In one embodiment, as discussed in detail below, for an image that shows a fake image of dog (e.g. Fake image 510), an answer of Chihuahua has a confidence level 1.0, an answer of Dog has a confidence level of 0.99, an answer of Puppy has a confidence level 0.99, an answer of poodle has 0.98, an answer of wolf has 0.6, an answer of panda as 0.2, an answer of Ostrich is 0.1. If the upper threshold is set at 0.9, any answers in the "dog" breed would pass while others would fail. In this embodiment, if the lower threshold is set at 0.4, then an answer of "Wolf" would give user a 2nd chance and with a hint such as "it is similar, but domestication is different," etc.

In another embodiment, the image is a composite image and the question (Level 1 350) is "How many dogs are in the picture?" In this embodiment, if the image has 4 dogs, 2 cats and 2 wolfs, an answer of "4" has a confidence level 1.0, while "3" has a confidence level 0.8 and "2" has a confidence level 0.4. As such, if the lower threshold is 0.5, intelligent user verification system 330 begins enforcing a level 2 question if the user response (Level 1 360) is "2".

When intelligent user verification system 330 determines that the confidence value is above an upper threshold, intelligent user verification system 330 grants access to user 300 via requesting device 310. When intelligent user verification system 330 determines that the confidence value is between a lower threshold and the upper threshold, intelligent user verification system 330 provides a hint to requesting device 310 (see FIG. 8 and corresponding text for further details).

When intelligent user verification system 330 determines that the confidence value is below the lower threshold, intelligent user verification system 330 generates and provides level 2 question 370 (second cognitive level) to requesting device 310. In one embodiment, level 2 question 370 is an IQ (intelligence quotient) question such as a pattern recognition question that is at a higher cognitive level than level 1 question 350 (see FIG. 6 and corresponding text for further details).

Intelligent user verification system 330 receives level 2 response 380 and determines whether level 2 response 380 is correct. If level 2 response 380 is correct, intelligent user verification system 330 grants access to user 300 via requesting device 310 (see FIG. 8 and corresponding text for further details). If level 2 response 380 is incorrect, intelligent user verification system 330 generates an error message and notifies requestor 300 accordingly.

Figure 4:
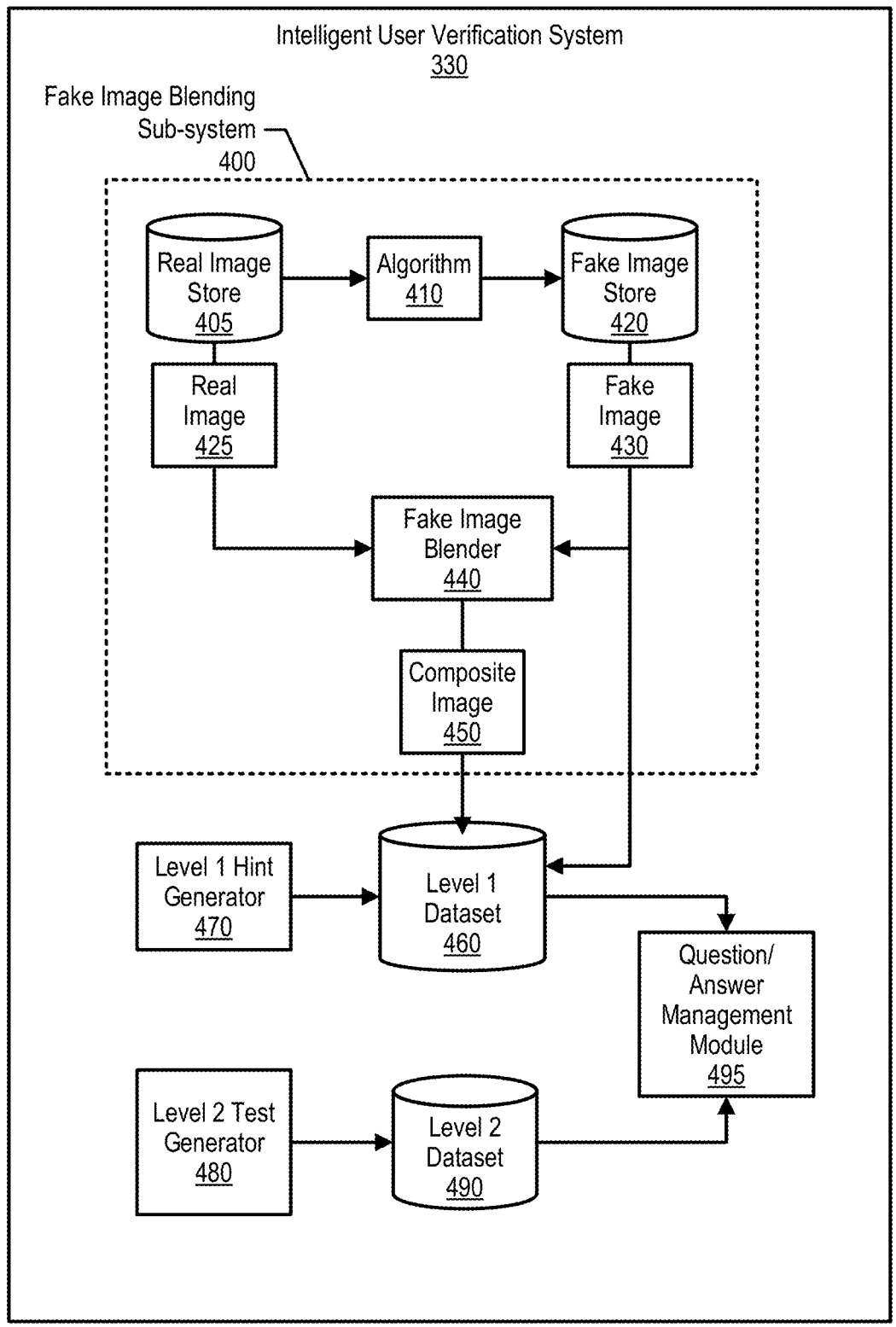
FIG. 4 is an exemplary diagram depicting a detail diagram of an intelligent user verification system.

FIG. 4 is an exemplary diagram depicting a detail diagram of an intelligent user verification system. Intelligent user verification system 330 includes fake image blending sub-system 400. Fake image blending sub-system 400 collects a set of real images and stores the set of real images in real image store 405. Fake image blending sub-system 400 then uses algorithm 410 to generate a fake image for each real image in real image store 405. In one embodiment, algorithm 410 generates fake images to trick linear or non-linear machine learning systems. In this embodiment, algorithm 410 generates fake images by adding distortion data into a real image to deceive a malicious machine learning system. Algorithm 410 may generate fake images by using back propagation techniques to determine a type of "shape" that a malicious machine learning system is searching for at a point in its neural network and add the shape into an image without over distorting the image so that a human is still able to determine the image.

Fake image blending sub-system 400 uses fake image blender 440 to mix multiple images either from the real image store 405 (real image 425) or fake image store (fake image 430) using image blending techniques to create composite image 450.

For each image in real image store 405, fake image blending sub-system 400 creates a set of labels for the object(s) in the dataset with confidence levels based on a machine learning algorithm. For example, for a Dog' image, intelligent user verification system 330 could generate a label "Wolf" with a confidence level 0.6. In this embodiment, the labels are used for the corresponding fake images as well as the real images.

Figure 5:
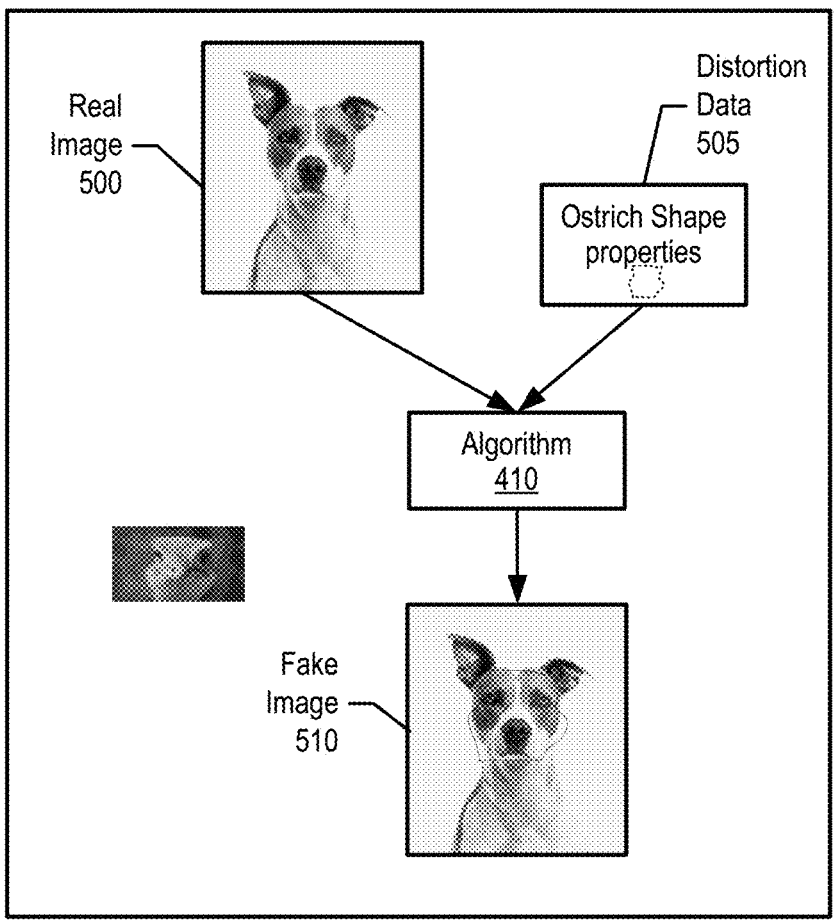
FIG. 5 is an exemplary diagram of a level 1 question that is at a first cognitive level as discussed herein.
Figure 5:
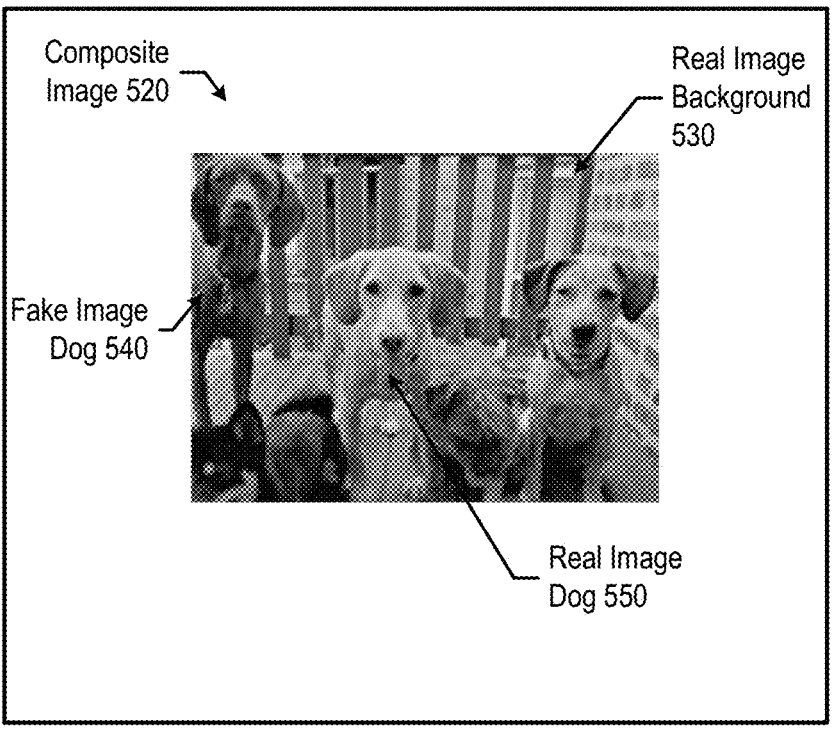

Intelligent user verification system 330 also generates one or more labels for composite image 450 in the form of a question/answer (QA) pair (see FIG. 5 and corresponding text for further details). For example, composite image 450 could include a mountain range, meadow, trees, pond, X number of people, dogs, etc., and requestor 300 is presented with the following questions: 1) how many mountain peaks?; 2) What is the color of the person's shirt who is wearing a hat?; 3) How many (imaginary) pandas are in the lower left quadrant? Composite image 450 allows combining object detection and combining math problems that are hard for computer bots but easy for a human.

Figure 8:
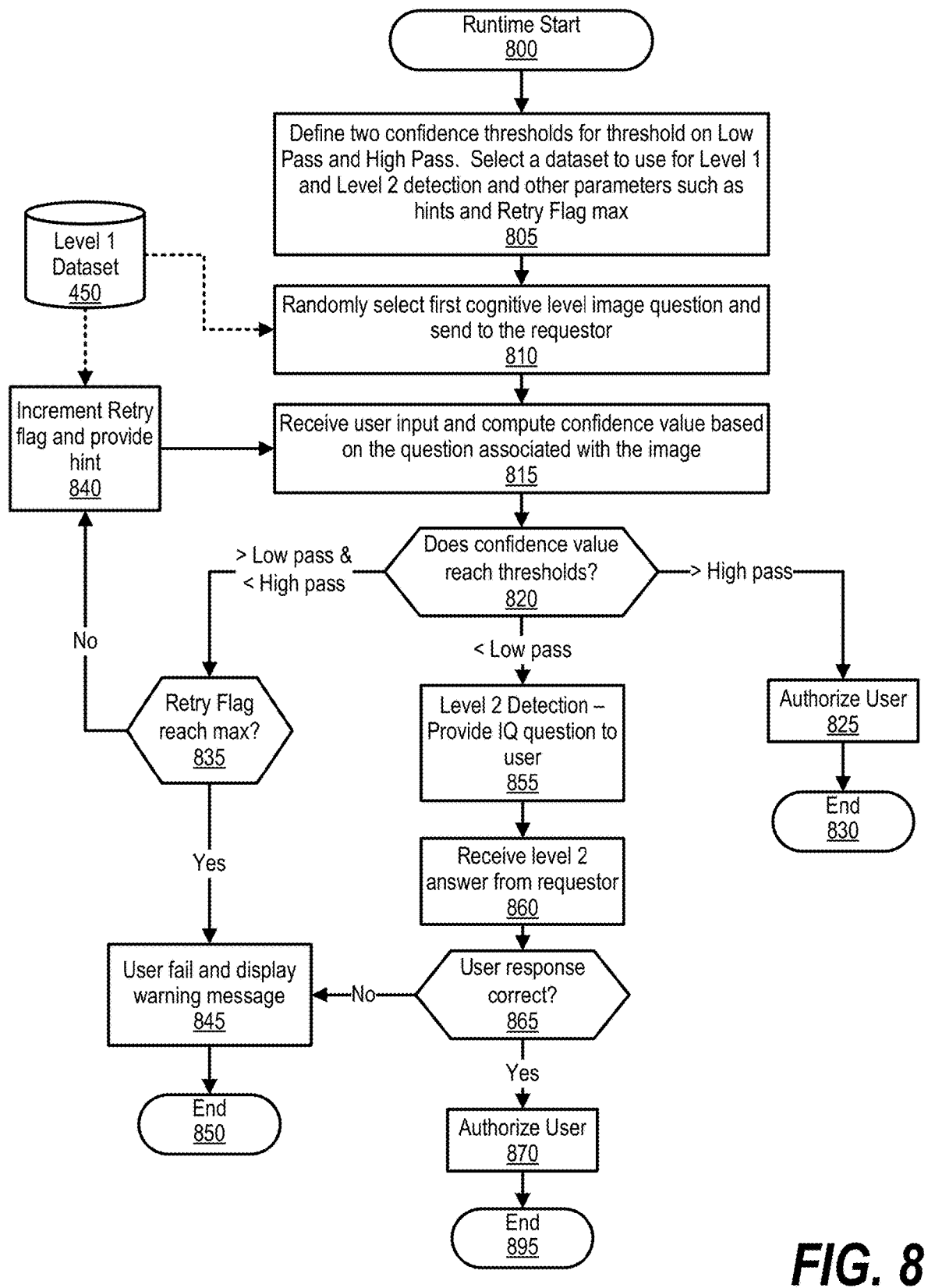
FIG. 8 is an exemplary flowchart showing steps taken to determine whether a requestor is a human.

Level 1 hint generator 470 creates a hint (or multiple hints) to the image set that intelligent user verification system 330 uses to remind requestor 300 if requestor 300's first attempt to answer a level 1 question is incorrect (see FIG. 8 and corresponding text for further details).

Figure 6:
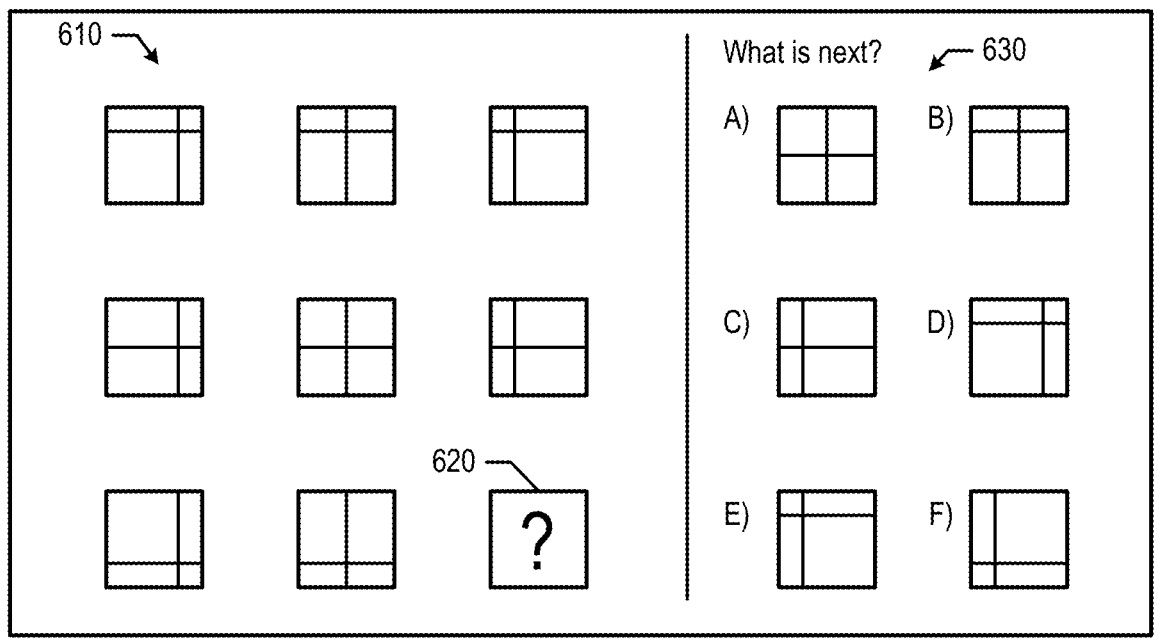
FIG. 6 is an exemplary diagram of a level 2 question that is at a second cognitive level as discussed herein.

Intelligent user verification system 330 includes level 2 test generator 480, which may receive input from an administrator to generate second cognitive level questions such as level 2 question 600 shown in FIG. 6. At runtime, intelligent user verification system 330 uses question/answer management module 495 to send questions from level 1 dataset 460 and level 2 dataset 490 as needed to requestor 300.

FIG. 5 is an exemplary diagram showing various image types as discussed herein. Real image 500 is an image of a dog without injected distortion data and, as such, a computer bot would be able to determine that real image 500 is a picture of a dog. To deceive the computer bot, algorithm 410 injects distortion data 505 (e.g., ostrich shape properties) into real image 500 and generates fake image 510. In turn, the computer bot analyzes fake image 510 and determines that fake image 510 is a picture of an ostrich (incorrect answer) whereas a human views fake image 510 and determines that fake image 510 is a picture of a dog (correct answer). Fake image 510 shown in FIG. 5 is also referred to herein as a simple image, which is a single image that is distorted and is used during level 1 questioning.

FIG. 5 also shows an example of a composite image (composite image 520) that is also used during level 1 questioning. Composite image 520 is a combination of multiple images that include real image background 530 (no distortion), fake image dog 540 (with distortion), and real image dog 550 (no distortion). Intelligent user verification system 330 may send composite image 520 to requestor 300 and ask requestor 300 to identify the number of dogs in the image. If requestor 300 is a computer bot then the computer bot will not identify fake image dog 540 as a dog and will provide an incorrect answer.

FIG. 6 is an exemplary diagram of a level 2 question that is at a second cognitive level as discussed herein. Level 2 question 600 includes pattern area 610 with question 620, which asks requestor 300 to select the next pattern from possible answer area 630. Possible answer area 630 includes possible answers to question 620 and requestor 300 answers question 620 by either selecting one of the answers or entering a character (A, B, C, etc.) to answer question 620. Intelligent user verification system 330 receives requestor 300's answer and authorizes requestor 300 if the answer is correct, or fails requestor 300 if the answer is incorrect.

Figure 7:
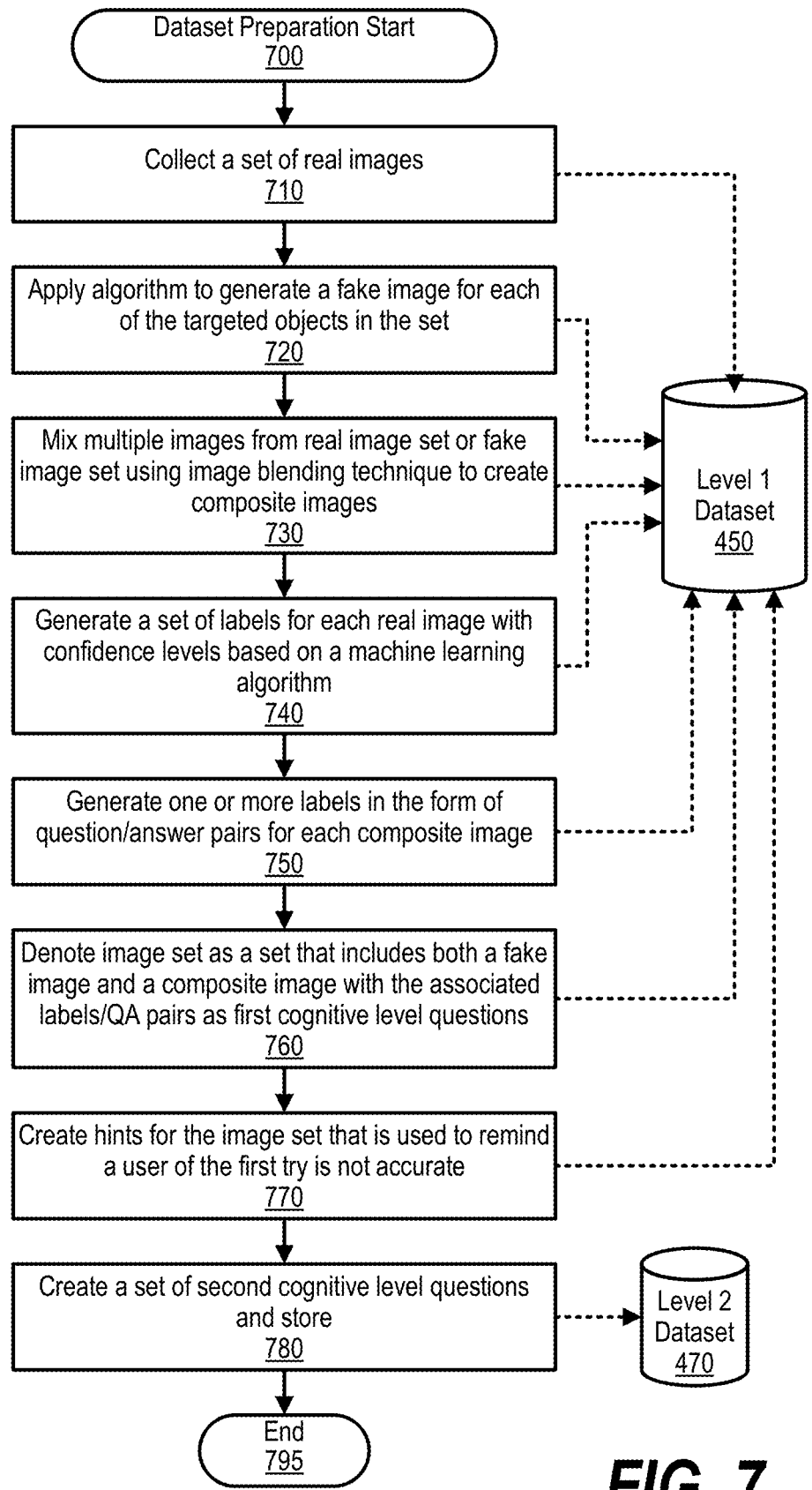
FIG. 7 is an exemplary flowchart showing steps taken to generate different cognitive level questions and corresponding hints for use with the approach discussed herein.

FIG. 7 is an exemplary flowchart showing steps taken to generate and prepare cognitive level question data (e.g., images) and corresponding hints for during runtime. FIG. 7 processing commences at 700 whereupon, at step 710, the process collects a set of real images, such as from a corpus of stock images. At step 720, the process applies an algorithm (algorithm 410) to generate a fake image for each of the targeted objects in the set of real images as discussed herein.

At step 730, the process mixes multiple images from the real image set or fake image set using image blending technique to create composite images as discussed herein. At step 740, the process generates a set of labels for each real image with confidence levels based on a machine learning algorithm. In one embodiment, the labels are automatically generated using a visual recognition AI based service. In this embodiment, the AI based service recognizes many objects/scenes and generates several labels with a confidence of each. For example, for a dog picture, the AI based service may generate labels/confidence values of: 1) Dog, 0.9; 2) Wolf: 0.6; and 3) Rabbit: 0.5.

In one embodiment, an image may have two or more correct answers based on a given threshold. For example, an image may have two labels of Dog 0.98, and Chihuahua 0.95. In this example, if a user answers "Dog" then the calculated user confidence is 0.98. If a user answers "Chihuahua" then the calculated user confidence is 0.95. The confidence/threshold value in step 740 (data prep time) is different from the user confidence/thresholds set for runtime operation (see FIG. 8 and corresponding text for further details).

At step 750, the process generates one or more labels in the form of question/answer pairs for each composite image. At step 760, the process denotes an image set as a set that includes either a fake image or a composite image with the associated labels/QA pairs. At step 770, the process creates hints for the image set that is used to remind a user of the first try is not accurate as discussed herein.

At step 780, the process creates a set of second cognitive level questions (IQ questions) and stores the second cognitive level questions in level 2 dataset 470 (see FIG. 6 and corresponding text for further details). FIG. 7 processing thereafter ends at 795.

FIG. 8 is an exemplary flowchart showing steps taken to determine whether a requestor is a human. FIG. 8 processing commences at 800 whereupon, at step 805, the process defines two confidence thresholds for threshold on LowPass and HighPass as discussed herein. The process selects a dataset to use for level 1 first cognitive level and level 2 second cognitive level detection and other parameters such as hints and an amount of times that a requestor is allowed to attempt to answer a level 1 question.

At step 810, the process initiates level 1 detection and randomly presents an image question from level 1 dataset 450 as question 350 to requestor 300. At step 815, the process receives level 1 response 360 and computes a confidence value based on the question associated with the image. In one embodiment, the process computes a confidence value by matching requestor 300's response with labels generated from the data preparation stage (see FIG. 7 and corresponding text for further details) and using the matched label's confidence level accordingly. For example, if requestor 300's answer is "wolf" and the "wolf" label has a confidence value of 0.6, then the process determines that requestor 300's confidence value is 0.6.

In one embodiment, requestor 300 may respond with a partial match, such as "bulldog" when the correct answer is "dog." In this embodiment, the process may use a string matching approach to compute a confidence value, such as a normalized distance metric approach.

The process determines as to whether the confidence value is below the lowpass threshold, above the high pass threshold, or between the lowpass threshold and the high pass threshold (decision 820). If the confidence value is above the highpass threshold, then decision 820 branches to the 'highpass' branch whereupon the process authorizes requestor 300 at step 825 and FIG. 8 processing thereafter ends at 830.

On the other hand, if the confidence value is between the lowpass threshold and the highpass threshold, then decision 820 branches to the '>Lowpass & <Highpass" branch, whereupon the process determines as to whether the retry Flag has reached the maximum amount of attempts (decision 835). If the retry Flag has not reached the maximum amount of attempts, then decision 835 branches to the 'no' branch which loops back to increment the Retry flag and provides a hint to requestor 300 from level 1 dataset 450 (step 840).

On the other hand, if the retry Flag has reached the maximum amount of attempts, decision 835 branches to the 'yes' branch whereupon, at step 845, the process fails requestor 300 and displays a warning message. FIG. 8 processing thereafter ends at 850.

Referring back to decision 820, if the input value result is less than the lowpass threshold, indicating that the response is off target and a retry or hint would not help, then decision 820 branches to the '<lowpass' branch whereupon, at step 855, the process initiates level 2 Detection and provides a second cognitive level question (level 2 question 370) to requestor 300. At step 860, the process receives level 2 response 380 from requestor 300.

The process determines as to whether level 2 response 380 is a correct answer (decision 865). If level 2 response 380 is a correct answer, then decision 865 branches to the 'yes' branch whereupon the process authorizes requestor 300 at step 870 and FIG. 8 processing thereafter ends at 895.

On the other hand, if level 2 response 380 is an incorrect answer, then decision 865 branches to the 'no' branch whereupon the process fails requestor 300 (step 845) and FIG. 8 processing thereafter ends at 850.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    selecting a first image from a plurality of images, wherein the first image is a real image that is unaltered;
    generating a set of hints that correspond to the first image;
    injecting a set of shape properties corresponding to a second image into the first image to create a fake image;
    providing a first question to a requestor requesting access to a resource, wherein the first question is about the fake image and corresponds to a first cognitive level;
    computing a confidence level of a first answer received from the requestor responding to the first question;
    in response to determining that the confidence level of the first answer is below a first confidence threshold and above a second confidence threshold:
        providing at least one hint from the set of hints to the requestor;
        receiving a different first answer from the requester in response to providing the at least one hint to the requestor;
        computing a different confidence level of the different first answer; and
        granting access of the resource to the requestor in response to determining that the different confidence level is above the first confidence threshold.

2. The method of claim 1 further comprising:
    generating a composite image by combining the fake image with a second image from the plurality of images; and
    utilizing the composite image in the first question.

3. The method of claim 1 further comprising:
    prior to providing the first question to the requestor, generating a set of labels and a corresponding set of confidence values at the real image;
    matching the first answer against one of the set of labels;
    selecting one of the set of confidence values that corresponds to the matched label; and
    utilizing the selected confidence value during the computing of the confidence level.

4. The method of claim 1 further comprising:
    in response to determining that the different confidence level of the first answer is below the first confidence threshold and above the second confidence threshold:
        computing an amount of times that the at least one hint of the set of hints has been provided to the requestor; and
        rejecting the request to access the resource in response to determining that the amount of times reaches a retry threshold.

5. An information handling system comprising:
    one or more processors;
    a memory coupled to at least one of the processors;
    a set of computer program instructions stored in the memory and executed by at least one of the processors in order to perform actions of:
        selecting a first image from a plurality of images, wherein the first image is a real image that is unaltered;
        generating a set of hints that correspond to the first image;
        injecting a set of shape properties corresponding to a second image into the first image to create a fake image;
        providing a first question to a requester requesting access to a resource, wherein the first question is about the fake image and corresponds to a first cognitive level;
        computing a confidence level of a first answer received from the requester responding to the first question;

in response to determining that the confidence level of the first answer is below a first confidence threshold and above a second confidence threshold:
  providing at least one hint from the set of hints to the requestor;
  receiving a different first answer from the requestor in response to providing the at least one hint to the requestor:
  computing a different confidence level of the different first answer; and
  granting access of the resource to the requestor in response to determining that the different confidence level is above the first confidence threshold.

6. The information handling system of claim 5 wherein the processors perform additional actions comprising:
  generating a composite image by combining the fake image with a second image from the plurality of images; and
  utilizing the composite image in the first question.

7. The information handling system of claim 5 wherein the processors perform additional actions comprising:
  prior to providing the first question to the requestor, generating a set of labels and a corresponding set of confidence values at the real image;
  matching the first answer against one of the set of labels;
  selecting one of the set of confidence values that corresponds to the matched label; and
  utilizing the selected confidence value during the computing of the confidence level.

8. The information handling system of claim 5 wherein the processors perform additional actions comprising:
  in response to determining that the different confidence level of the first answer is below the first confidence threshold and above the second confidence threshold:
    computing an amount of times that the at least one hint of the set of hints has been provided to the requestor; and
    rejecting the request to access the resource in response to determining that the amount of times reaches a retry threshold.

9. A computer program product stored in a computer readable storage medium, comprising computer program code that, when executed by an information handling system, causes the information handling system to perform actions comprising:
  image that is unaltered;
  generating a set of hints that correspond to the first image;
  injecting a set of shape properties corresponding to a second image into the first image to create a fake image;
  providing a first question to a requestor requesting access to a resource, wherein the first question is about the fake image and corresponds to a first cognitive level;
  computing a confidence level of a first answer received from the requestor responding to the first question;
  in response to determining that the confidence level of the first answer is below a first confidence threshold and above a second confidence threshold:
    providing at least one hint from the set of hints to the requestor;
    receiving a different first answer from the requestor in response to providing the at least one hint to the requestor;
    computing a different confidence level of the different first answer; and
    granting access of the resource to the requestor in response to determining that the different confidence level is above the first confidence threshold.

10. The computer program product of claim 9 wherein the information handling system performs further actions comprising:
  generating a composite image by combining the fake image with a second image from the plurality of images; and
  utilizing the composite image in the first question.

11. The computer program product of claim 9 wherein the information handling system performs further actions comprising:
  prior to providing the first question to the requester, generating a set of labels and a corresponding set of confidence values at the real image;
  matching the first answer against one of the set of labels;
  selecting one of the set of confidence values that corresponds to the matched label; and
  utilizing the selected confidence value during the computing of the confidence level.

12. The computer program product of claim 9 wherein the information handling system performs further actions comprising:
  in response to determining that the different confidence level of the first answer is below the first confidence threshold and above the second confidence threshold:
    computing an amount of times that the at least one hint of the set of hints has been provided to the requestor; and
    rejecting the request to access the resource in response to determining that the amount of times reaches a retry threshold.

* * * * *